(12) United States Patent
Pavlidis et al.

(10) Patent No.: US 9,135,255 B2
(45) Date of Patent: Sep. 15, 2015

(54) SYSTEM AND METHOD FOR MAKING GIFT RECOMMENDATIONS USING SOCIAL MEDIA DATA

(71) Applicant: Wal-Mart Stores, Inc., Bentonville, AR (US)

(72) Inventors: Ioannis Pavlidis, Boulder, CO (US); Wei Shen, Danville, CA (US); Anand Rajaraman, Palo Alto, CA (US)

(73) Assignee: Wal-Mart Stores, Inc., Bentonville, AR (US)

(*) Notice: Subject to any disclaimer, the term of this patent is extended or adjusted under 35 U.S.C. 154(b) by 0 days.

(21) Appl. No.: 13/627,877

(22) Filed: Sep. 26, 2012

(65) Prior Publication Data

US 2014/0089327 A1    Mar. 27, 2014

(51) Int. Cl.
*G06F 17/30* (2006.01)
*G06Q 30/02* (2012.01)
*G06Q 50/00* (2012.01)

(52) U.S. Cl.
CPC .......... *G06F 17/30017* (2013.01); *G06Q 30/02* (2013.01); *G06Q 50/01* (2013.01)

(58) Field of Classification Search
CPC .............................. G06Q 30/02; G06Q 10/104
USPC .............. 707/1/1, 724, 780, 728, 719, 5, 709; 705/41, 14.73, 14.53
See application file for complete search history.

(56) References Cited

U.S. PATENT DOCUMENTS

| | | | |
|---|---|---|---|
| 7,174,307 B2 | 2/2007 | Sakai | |
| 7,624,081 B2* | 11/2009 | Zhao et al. | 706/20 |
| 7,685,192 B1* | 3/2010 | Scofield et al. | 707/709 |
| 7,881,971 B1 | 2/2011 | Nguyen | |
| 8,290,999 B2* | 10/2012 | Shepherd et al. | 707/728 |
| 8,386,338 B2 | 2/2013 | Farney | |
| 8,478,661 B1 | 7/2013 | Kressler | |
| 8,700,644 B1* | 4/2014 | Allen et al. | 707/754 |
| 8,782,037 B1* | 7/2014 | Barad et al. | 707/723 |
| 2002/0023009 A1 | 2/2002 | Ikeda | |
| 2002/0095298 A1 | 7/2002 | Ewing | |
| 2006/0095338 A1 | 5/2006 | Seidel | |
| 2006/0106780 A1* | 5/2006 | Dagan | 707/3 |
| 2008/0215623 A1* | 9/2008 | Ramer et al. | 707/104.1 |
| 2008/0294624 A1* | 11/2008 | Kanigsberg et al. | 707/5 |
| 2009/0083260 A1* | 3/2009 | Artom et al. | 707/5 |
| 2009/0171739 A1 | 7/2009 | De | |
| 2009/0327129 A1* | 12/2009 | Collas et al. | 705/41 |
| 2010/0023341 A1 | 1/2010 | Ledbetter | |
| 2010/0114702 A1* | 5/2010 | Wu et al. | 705/14.53 |

(Continued)

FOREIGN PATENT DOCUMENTS

| | | |
|---|---|---|
| WO | WO03077164 A1 | 9/2003 |
| WO | WO2009109949 A1 | 9/2009 |
| WO | WO2011065948 A1 | 6/2011 |

*Primary Examiner* — Mariela Reyes
*Assistant Examiner* — Thong Vu
(74) *Attorney, Agent, or Firm* — Bryan Cave LLP

(57) ABSTRACT

Disclose are methods for evaluating a user's interests and making gift recommendations using social media data. Interests and attributes of a user may be detected from social media content and products corresponding to the interests and attributes may be selected and presented as gift recommendations for the user. Methods are disclosed for resolving ambiguity as to interests reflected by textual data in social media content. Also disclosed are methods for inferring a user's interests from the interests of friends of the user.

16 Claims, 12 Drawing Sheets

(56) References Cited

U.S. PATENT DOCUMENTS

| | | |
|---|---|---|
| 2010/0280879 A1 | 11/2010 | O'Sullivan |
| 2010/0312769 A1* | 12/2010 | Bailey et al. .................. 707/740 |
| 2011/0060661 A1 | 3/2011 | Chai |
| 2011/0307478 A1* | 12/2011 | Pinckney et al. ............. 707/724 |
| 2012/0102021 A1* | 4/2012 | Hill et al. ...................... 707/711 |
| 2012/0290518 A1* | 11/2012 | Flinn et al. ...................... 706/12 |
| 2012/0296974 A1* | 11/2012 | Tabe .............................. 709/204 |
| 2013/0073400 A1* | 3/2013 | Heath ........................ 705/14.73 |
| 2013/0073430 A1 | 3/2013 | Gallen |
| 2013/0144732 A1 | 6/2013 | Rothschild |
| 2014/0108428 A1* | 4/2014 | Luo et al. ...................... 707/748 |

\* cited by examiner

SYSTEM AND METHOD FOR MAKING GIFT RECOMMENDATIONS USING SOCIAL MEDIA DATA

RELATED U.S. APPLICATION

This application is related to U.S. application Ser. No. 13/627,859, filed 09/26/2012, U.S. application Ser. No. 13/627,867, filed 09/26/2012, and U.S. application Ser. No. 13/627,896, filed 09/26/2012. The applications are incorporated herein by reference for all purposes.

BACKGROUND

1. Field of the Invention

This invention relates to systems and methods for making product recommendations appropriate for a recipient's interest and that are suited for giving as a gift.

2. Background of the Invention

One of the facets of shopping is gifting. Gifting may be the act of giving a present to somebody because of an event (e.g., birthday) or occasion (e.g., house warming party). People may also treat themselves or loved ones to a gift. Regardless of the occasion or the reason for gifting, there is often one common denominator: delight the receiver. Although some approaches have been used to provide recommendations according to a simple analysis of interests of the recipient these do not take into account whether products related to these interests are in fact suitable for giving as a gift.

Accordingly, what is needed is a system and method for identifying gifts that are likely to relate to recipients interest and also be appropriate as gifts intended to delight the receiver.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
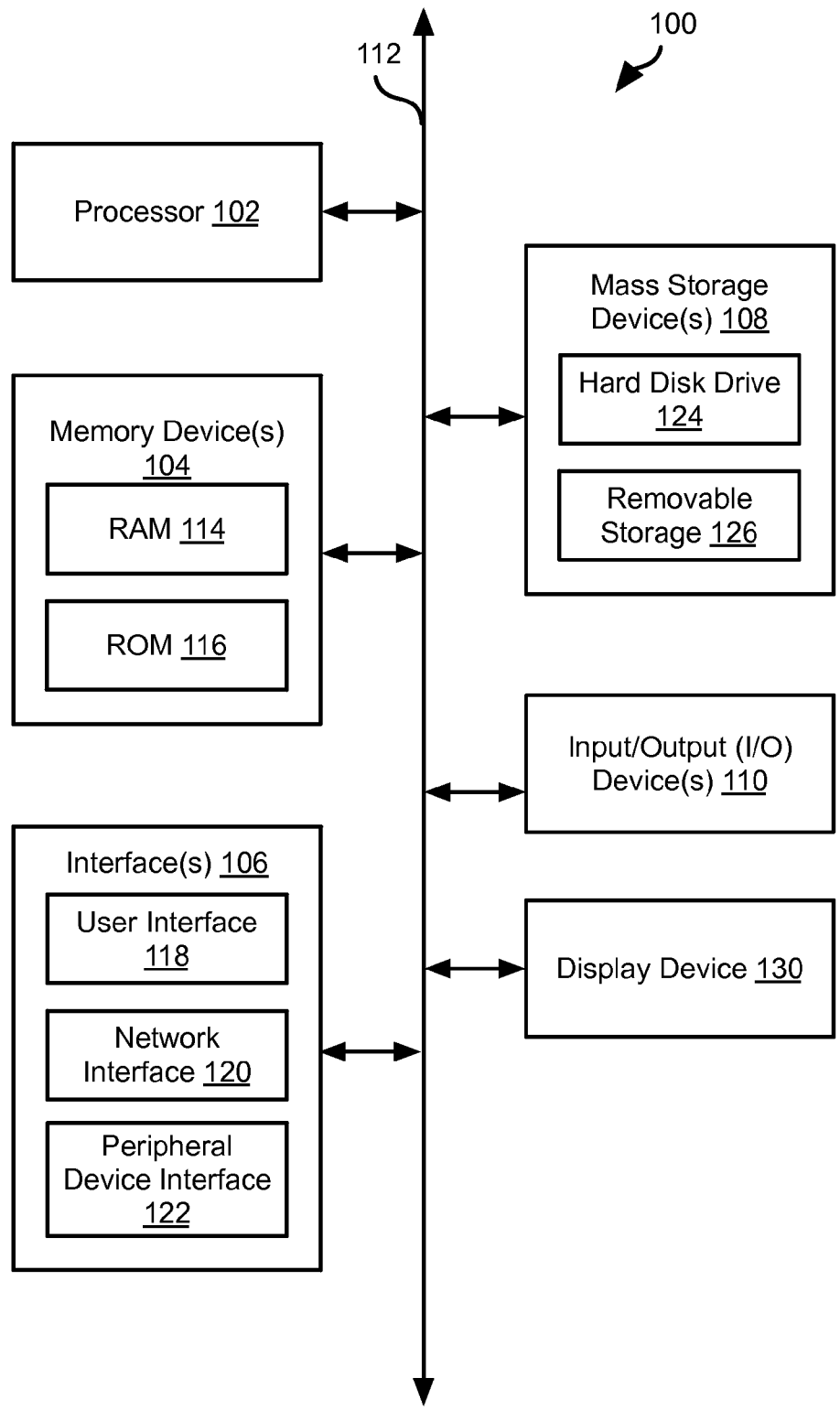
FIG. 1 is a schematic block diagram of an example computer system.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods. Accordingly, the invention has been developed to provide apparatus and methods for determining the giftability of a product for use in making gift recommendations.

Embodiments are disclosed for making gift recommendations using social media data. Interests and attributes of a user may be detected from social media content and products corresponding to the interests and attributes may be selected and presented as gift recommendations for the user. Methods are disclosed for resolving ambiguity as to interests reflected by textual data in social media content. Also disclosed are methods for inferring a user's interests from the interests of friends of the user. Various other embodiments are also disclosed and claimed.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a block diagram illustrating an example computing device 100. Computing device 100 may be used to perform various procedures, such as those discussed herein. Computing device 100 can function as a server, a client, or any other computing entity. Computing device can perform various monitoring functions as discussed herein, and can execute one or more application programs, such as the application programs described herein. Computing device 100 can be any of a wide variety of computing devices, such as a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer-readable media, such as cache memory.

Memory device(s) 104 include various computer-readable media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer readable media, such as magnetic tapes, magnetic disks, optical disks, solid-state memory (e.g., Flash memory), and so forth. As shown in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, microphones, monitors or other display devices, speakers, printers, network interface cards, modems, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments. Example interface(s) 106 include any number of different network interfaces 120, such as interfaces to local area networks (LANs), wide area networks (WANs), wireless networks, and the Internet. Other interface (s) include user interface 118 and peripheral device interface 122. The interface(s) 106 may also include one or more user interface elements 118. The interface(s) 106 may also include one or more peripheral interfaces such as interfaces for printers, pointing devices (mice, track pad, etc.), keyboards, and the like.

Bus 112 allows processor(s) 102, memory device(s) 104, interface(s) 106, mass storage device(s) 108, and I/O device (s) 110 to communicate with one another, as well as other devices or components coupled to bus 112. Bus 112 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 100, and are executed by processor(s) 102. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 2:
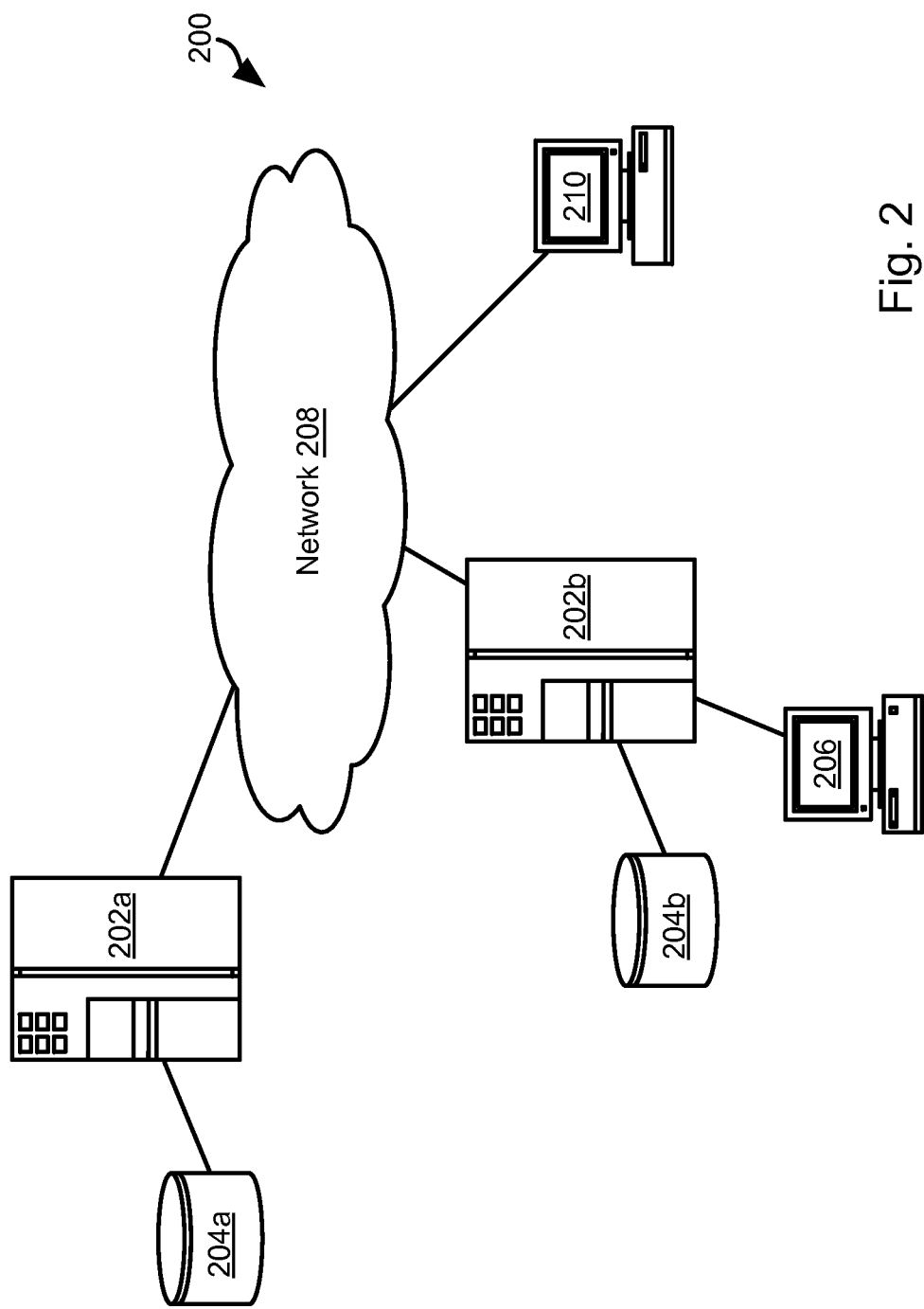
FIG. 2 is a schematic block diagram of an example network environment.

FIG. 2 illustrates an example of a computing environment 200 suitable for implementing the methods disclosed herein. In some embodiments, a server 202a provides access to a database 204a in data communication therewith. The database 204a may store social media information such as a user profile as well as a list of other user profiles of friends and associates associated with the user profile. The database 204a may additionally store postings made by the user associated with the user profile. The social media information hosted by the database 204a may correspond to social media such as Facebook, Twitter, Foursquare, LinkedIn, or the like. The server 202a may provide access to the database 204a to users associated with the user profiles and/or to others. For example, the server 202a may implement a web server for receiving requests for data stored in the database 204a and formatting requested information into web pages. The web server may additionally be operable to receive information and store the information in the database 204a.

A server 202b may be associated with a merchant or by another entity providing gift recommendation services. The server 202b may be in data communication with a database 204b. The database 204b may store information regarding various products. In particular, information for a product may include a name, description, categorization, reviews, comments, price, past transaction data, and the like. The server 202b may analyze this data as well as data retrieved from the database 204a in order to perform methods as described herein. An operator may access the server 202b by means of a workstation 206, that may be embodied as any general purpose computer, tablet computer, smart phone, or the like.

The server 202a and server 202b may communicate with one another over a network 208 such as the Internet or some other local area network (LAN), wide area network (WAN), virtual private network (VPN), or other network. A user may access data and functionality provided by the servers 202a, 202b by means of a workstation 210 in data communication with the network 208. The workstation 210 may be embodied as a general purpose computer, tablet computer, smart phone or the like. For example, the workstation 210 may host a web browser for requesting web pages, displaying web pages, and receiving user interaction with web pages, and performing other functionality of a web browser. The workstation 210, workstation 206, servers 202a-202b, and databases 204a, 204b may have some or all of the attributes of the computing device 100.

Figure 3:
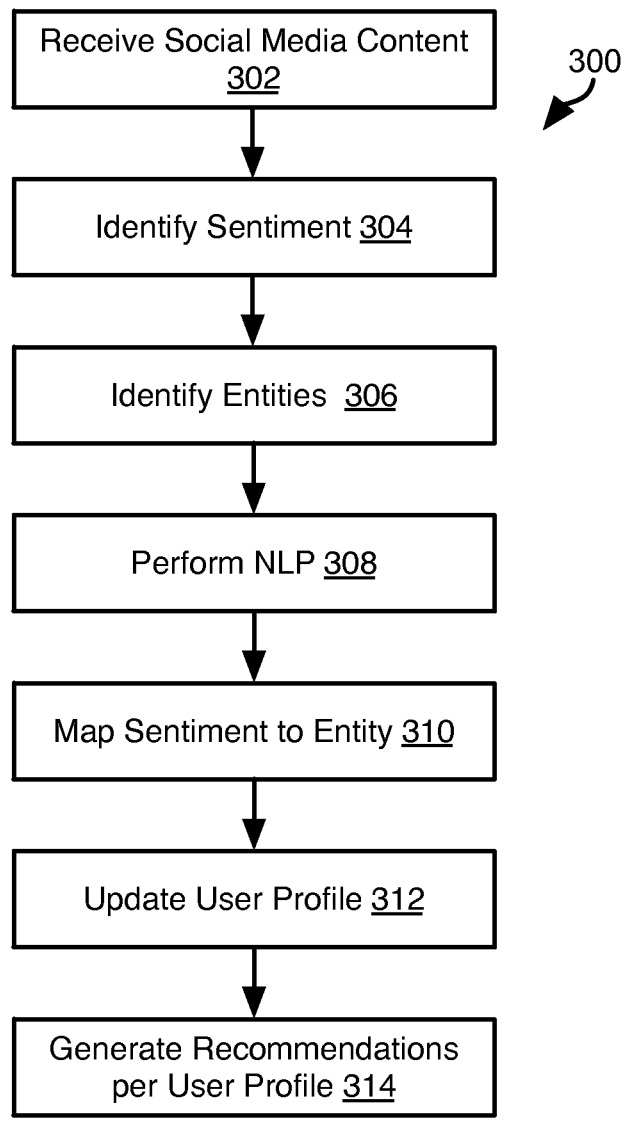
FIG. 3 is a process flow diagram of a method for generating a user profile in accordance with an embodiment of the present invention.

FIG. 3 illustrates a method for identifying one or more of user interests and user attributes according to social media content. The social media content may include content generated by a user over time such as Facebook™ postings, Twitter™ tweets, Foursquare™ checkins, Linkedin™ updates, or the like. The social media content may be distinguished from other social media data associated with a user, such as the user's profile for a given social media site and the users connections to friends, family, and other associates.

Accordingly, the method 300 may include receiving 302 social media content. The social media content may include any action taken by a user that can be associated with text or a concept. This may include the user typing content and posting to a social media site, linking to content in a posting, retweeting text, liking or disliking content, or the like.

Sentiment expressed in the received content may then be identified 304. This may include evaluating context, such as whether the content is a like or dislike on Facebook™. Identifying 304 sentiment may include identifying words indicating positive or negative feeling. For example, negative verbs like hate, dislike, did not like, and the like may be noted. Likewise, negative or unpleasant adjectives such as bad, lame, worst, and the like may be noted. Other parts of speech indicating negative sentiment may likewise be noted, such as adverbs and/or nouns that are well understood to have negative connotations.

Entities in the received content may also be identified 306. An entity may be an n-gram including one or more words. Entities may be identified by comparison to a taxonomy, dictionary, corpus of documents, or the like. Entities may include brand names, canonical product names, popularly used names for products, movie titles, book titles, song titles, celebrity names, politician names, and any other textual label that may be applied to a person, object, practice, abstract idea, or any other entity or action.

Natural language processing (NLP) may then be performed 308 to identify the parts of speech performed by the entities identified 306 and for other words in the content. As known in the art, NLP may be used to identify the subject, verb, direct object, indirect object, prepositional phrases, and other parts of speech constituting written or spoken text.

The sentiment identified 304 may then be mapped 310 to a particular entity based on the contextual information gained by performing 308 NLP. As an example, a sentiment expressed as "I didn't like A" may be analyzed to map the negative sentiment of didn't to the entity A, inasmuch as A is identifiable as the object of the verb "did." Entity identification may facilitate mapping of sentiment by ensuring that negative or positive sentiment that forms part of an entity is not mistaken for actual negative or positive sentiment. For example, extracting the movie title "Ten Things I Hate About You" would ensure that the verb "hate" is not improperly inferred to express negative sentiment. In a like manner titles expressing positive sentiment can be identified and the improper inference of sentiment may be avoided.

A user profile may then be updated 312 according to the identified entities and the sentiment associated thereto. That is to say, the user's positive or negative interest in an entity may be recorded in a profile associated with a user. Where positive or negative sentiment has already been noted in the profile, the sentiment may be augmented or decremented, i.e., by adjusting a numerical value, according to whether the identified sentiment for the entity agrees of disagrees, respectively, with the previously recorded sentiment for the entity.

Recommendations for the user may then be generated 314 according to the user profile, such as according to other methods described hereinbelow. As an example, products having interests corresponding thereto that match concepts having positive sentiment associated therewith in the user profile, may be selected and displayed as advertisements displayed to the user or displayed as gift recommendations for the user.

Figure 4:
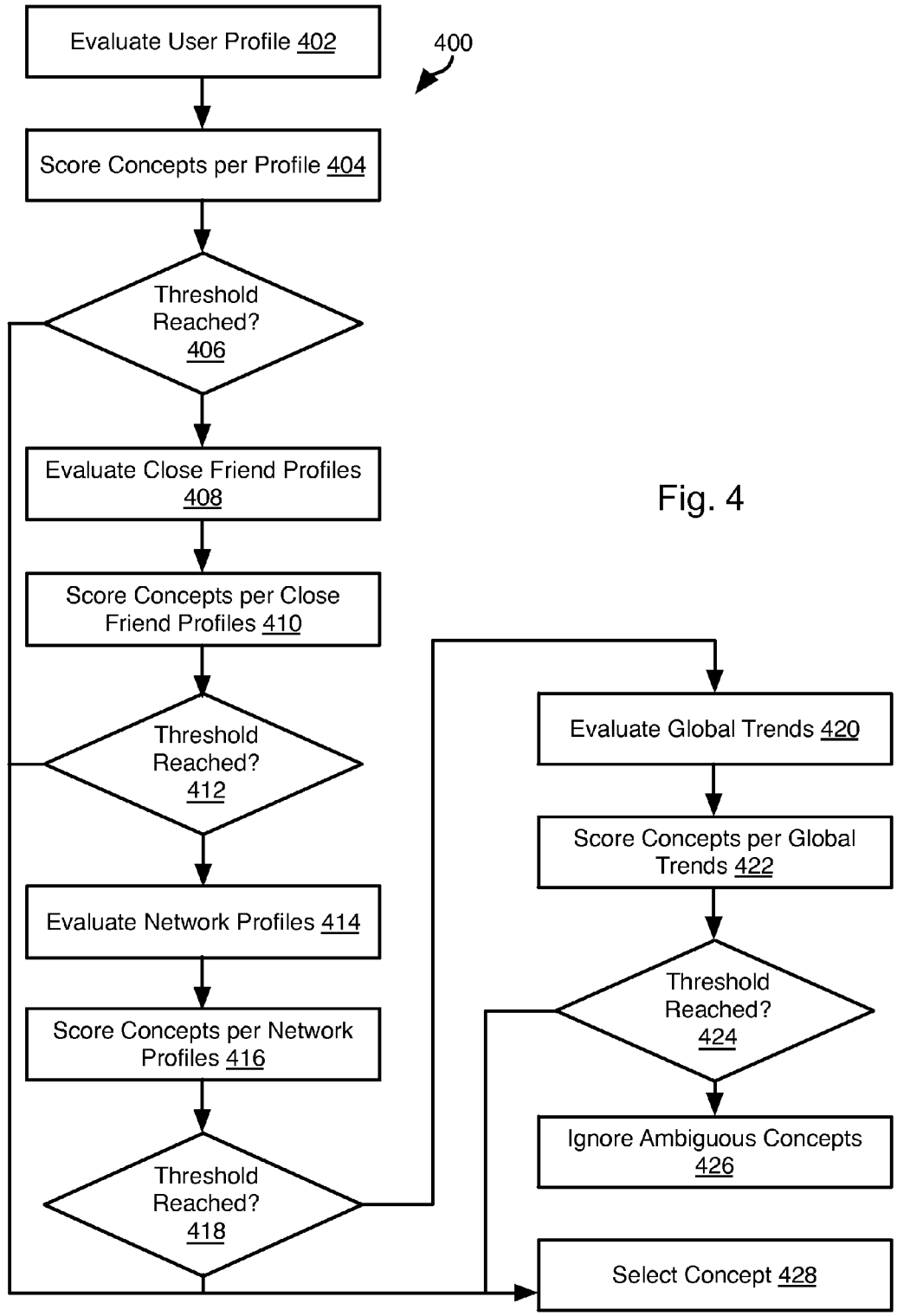
FIG. 4 is a process flow diagram of a method for resolving ambiguities as to a user's interests using social media data in accordance with an embodiment of the present invention.

Referring to FIG. 4, in some embodiments, entities identified in the method 300 may be mapped to concepts. This may be particularly important where the text representing an entity may have multiple meanings or map to multiple concepts. Accordingly, at any point prior to updating 312 of a user profile, ambiguity as to the actual concept intended for an entity may be resolved according to the method 400 of FIG. 4. The method 400 may also be used to resolve ambiguity in the concepts associated with social media content for other uses.

The method 400 may take as an input a set of concept candidates that have been identified as possibly corresponding with an entity, which may be a textual representation selected from social media content. The method 400 may include evaluating 402 the concept candidates with respect to a user profile and scoring 404 the concept candidates according to the user profile. The score may indicate consistency of a concept candidate with the user profile. For example, a concept candidate may exist as a node in a taxonomy with proximate parent, sibling, and descendent nodes in the hierarchy. Consistency may be measured as a correspondence between concepts identified in a user profile and concepts within a specified proximity in the taxonomy to the concept candidate. Consistency may additionally or alternatively be measured according to a correspondence between attributes of the user and attributes of the concept candidate.

For example, reference to the "Giants" in a sport context may reference either the New York Giants or the San Francisco Giants. A user profile may indicate residence in New York. Accordingly, the score assigned to the concept "New York Giants" may be augmented to indicate this consistency. The score may likewise may augmented for each item of data in the user profile that indicates consistency. The user profile used for the scoring 404 may include one or both of the user profile expressly created by a user and the user profile generated from analyzing the user's social media content, such as according to the methods disclosed herein.

The method 400 may include evaluating 402 the scores for the concept candidates to determine whether one or more thresholds have been reached. For example, a concept candidate score may be compared to an absolute threshold. A difference between the concept candidate scores may also be compared to a threshold. As noted, the method 400 is used to resolve ambiguity, accordingly a large difference in concept candidate scores may indicate a clear preference for the concept candidate with the larger score. Accordingly, the concept candidate score that exceeds one or more other concept candidates by a threshold amount may be selected as the concept associated with an entity.

If the threshold is not found 406 to have been met, then the method 400 may include evaluating 408 close friend profiles and scoring 410 concept candidates according to the close friend profiles. Which friends in a user's social network are close friends may be specified explicitly by the user or may be determined according to an analysis of connectivity, common interests, and interaction on the social network. Examples of methods for determining closeness of a social network relationship are described hereinbelow.

Scoring 410 concept candidates according to close friend profiles may be performed similarly to scoring 404 concepts according to user profile. That is to say, a score for the concept candidate, which may be the score calculated at step 404, may be augmented according to consistency of the concept candidate with the close friend profile, such as using the approach described hereinabove with respect to the scoring step 404. In some embodiments, consistency scores for each concept candidate may be calculated for each close friend and then these consistency scores may be averaged. The average value may then be used to augment the concept candidate score. In some embodiments a weighted average wherein consistency scores are weighted according to closeness of a relationship to the user may be used.

The concept candidate scores may then again be compared 412 to one or more thresholds to determine whether one or more threshold conditions have been met. This may include performing a comparison to one or more thresholds as described with respect to the evaluation performed at step 406. The threshold values used at step 412 may be the same or different from the threshold values used at step 406.

If the one or more threshold conditions are not found 412 to have been met, the method 400 may include evaluating 414 the profiles of other friends of the user that are not considered to be close friends, scoring 416 the concept candidates according to these profiles, and comparing 418 the scores for the concept candidates meet to one or more threshold conditions. The evaluating 414, scoring 416, and threshold comparison 418 steps may be performed in a like manner to the evaluating 408, scoring 410, and threshold comparison 412 steps described above. In some embodiments, no distinction is made between close friends and others such that steps 408-412 may be omitted.

If one or more threshold conditions are not found 418 to have been met, then the method 400 may include evaluating 420 global trends and scoring 422 the concept candidates according to consistency of the concept candidates with global trends. For example, for the text "go Giants!," the two concept candidates "New York Giants" and "San Francisco Giants" may be evaluated with respect to global popularity of these concepts for all social media users or a very large group of social media users. This may include tabulating the number of mentions of these concepts in social media postings. If the New York Giants were going to play in the Super Bowl and were the subject of many more social media postings, then the consistency score for the New York Giants may be augmented accordingly.

The consistency scores for the concept candidates may again be compared 424 to one or more threshold conditions as described above. If the one or more threshold conditions are not found 424 to have been met for any concept candidate, then the concept candidates may be ignored 426 inasmuch as no clear mapping has been determined. In some embodiments, if a common parent concept in a taxonomy for the ambiguous concepts can be found, then the closest parent concept in the taxonomy may be mapped to the entity. For example, if no way has been found to determine whether the text "go Giants!" corresponds to the New York Giants or the San Francisco Giants, then the closest common parent, which may be "sports" may be associated with the text in order to extract an interest of the user.

If any of the threshold comparison steps 406, 412, 418, 424 find required one or more threshold conditions to be met, then the concept candidate that satisfies the one or more threshold conditions may be selected 428 as the concept to be mapped to the entity.

Various alternative methods for performing the disambiguation may be used. In some embodiments, the evaluating and scoring steps of the method 400 may be performed in every instance and the final scores for the concept candidate may then be compared to one or more threshold conditions to determine which, if any, concept candidate corresponds to the identified entity. In some embodiments, consistency scores according one or more of the user profile, close friend profiles, other friend profiles, and global trends may be averaged, weighted and averaged, or otherwise combined to establish the consistency score for each concept candidate prior to comparison to one or more threshold conditions.

Figure 5:
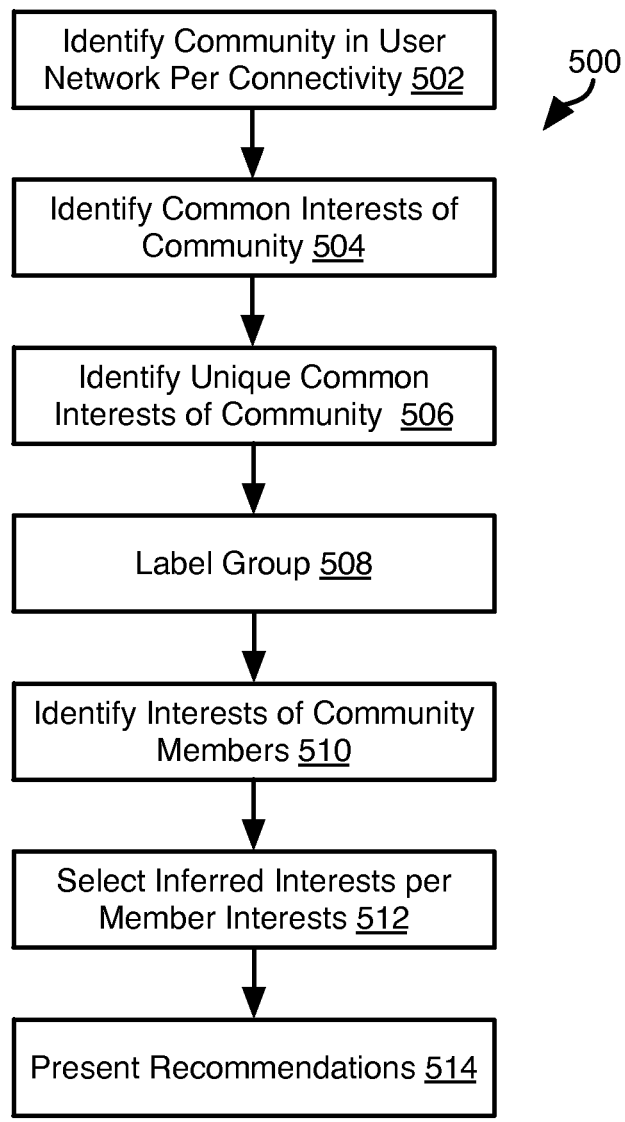
FIG. 5 is a process flow diagram of a method for inferring interests of a user from those of social media friends in accordance with an embodiment of the present invention.

Referring to FIG. 5, in some instances, a user may be a passive participant in social media and not provide very much detail on the user's interests and attributes. Accordingly, a method 500 may be used to infer potential interests according to the user's social network connections. The method 500 may also be used for users that provide abundant information in order to refine or expand the user's recognized interests.

The method 500 may include identifying 502 communities in the user's network according to connectivity. A group of friends may be grouped into a community due to each of the friends connection to the user and to each other. A group of friends may be grouped into a community due to the friends having all having one or more friends in common. A group of friends may also be grouped into a community due to a unique attribute or interest that is common to the group of friends. Some or all of these methods may be used in combination to identify communities from the user's social network. Various methods for identifying communities as known in the art may be used such as minimum-cut, hierarchical clustering, walk trap, modularity maximization, and click-based methods, and the like.

One or more common interest or attribute of each of the communities may then be identified 504. These interests and attributes may be analyzed to identify 506 one or more interests or attributes of each community that distinguishes the community from other communities. The community may be labeled 508 according to its distinguishing interest or attribute. In some embodiments, the identified communities and one or more of the common interests or attributes, unique common interest or attribute, and label, may be accessible or otherwise presented to the user to facilitate management of the user's social network.

Each of the communities may be evaluated to identify 510 interests of the friends in the community. The identified 510 interests may include interests that are different from any that are already included in the profile for the user. Interests that might be appropriate for the user may then be selected 512 according to the interests of the members of the communities. Recommendations for gifts that would be appropriate for the user may then be presented 514 to the user and the user's friends according to the selected inferred interests. The inferred interests may be used in some or all of the methods described herein for providing gift and other recommendations relating to the user.

In some embodiments, identifying 510 the interests of group members may identify more relevant interests. For example, within a community, the most popular interests for the community may be identified. The interests of members of the community may be ranked according to popularity within the community. In some embodiments, the interests of the community may additionally or alternatively be ranked according to an inverse of global popularity of the interests. That is to say, interests that have a high global popularity are not as helpful to define a community or identify a unique interest of a community. Accordingly, interests that are ranked in popularity in the community may also be ranked or the rankings adjusted or discounted according to global popularity. The top N interests, or top M % of the interests, as thus ranked may then be selected 512 as inferred interests for the user.

In some embodiments, in addition to identifying communities, the method 500 may include ranking or otherwise characterizing the closeness of the community to the user. This may include, for each community, identifying common interests between the user and the friends forming the community. The common interests may be evaluated with respect to global popularity of the common interests and discounted according to global popularity. For example, a base score may be associated with each common interest and then increased or decreased according to the inverse of the global popularity of the interests. These adjusted scores for the common interests of a community may then be summed, with the larger sum indicating greater "closeness" to the user. The base score for an interest may be calculated according to one or both of the number of friends in the community that have the interest and a ranking of the importance of the interest to the user. A closeness score for a community may also reflect an amount of interaction of the user with the members of the community. For example, a closeness score may be assigned or augmented in proportion or as a function of an amount of interaction of the user with members of the community.

Inferred interests may be selected 512 according to closeness of the community from which the interest was inferred. For example, the top N interests from all the communities may be ranked according to the closeness of the communities to the user. The top M interests of this ranking may be selected as inferred interests for the user.

Figure 6:
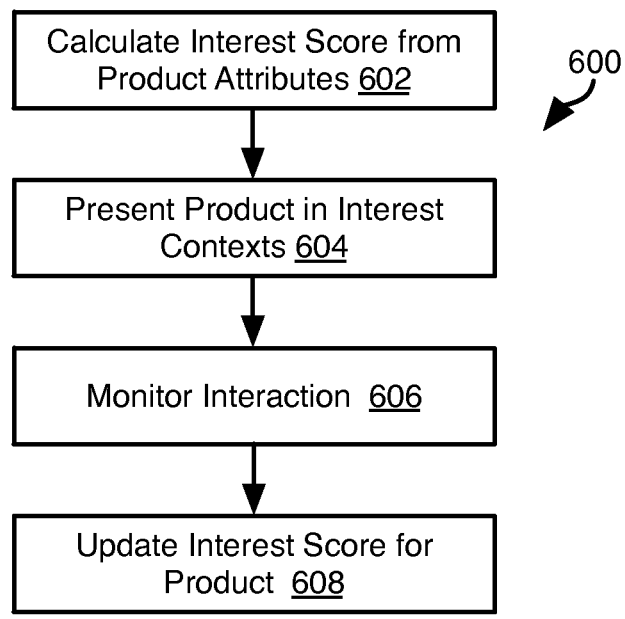
FIG. 6 is a process flow diagram of a method for associating interests with products in accordance with an embodiment of the present invention.

Referring to FIG. 6, in order to make gift recommendations for a user, products may have interests and attributes associated therewith that are used when evaluating the relevance of the products to the interests and attributes of the user. The method 600 of FIG. 6 may be used to define and refine the interests and attributes associated with a product.

The method 600 may include generating a product profile by calculating interest scores for a plurality of interests associated with a product based on the product's attributes. The product attributes may include a categorization in a product catalog, a text description, a gender designation, an appropriate age, and other data. Some of these attributes may simply map to an attribute that can be sued in a product profile. Other attributes may be analyzed to identify concepts relating to the product. For example, a product description and other information may be used as a document that is analyzed to identify concepts, such as using the methods for identifying and ranking concepts in a document described U.S. patent application Ser. No. 13/300,524, entitled "PROCESSING DATA FEEDS," filed Nov. 18, 2011, which is hereby incorporated herein by reference in its entirety.

In some embodiments, interests relevant to a product may be scored according to a proximity to the product in a concept hierarchy. For example, a product may be mapped to a node in a taxonomy. Other concepts included in nodes of the taxonomy that are proximate to the product (e.g. parent, sibling, child, nodes) may be scored according to their proximity in the hierarchy to the product node. In still other embodiments, interests relevant to a product may simply be manually be specified by a manufacturer or merchant.

The product profile with interest scores calculated 602 or otherwise specified may then be updated or refined according to subsequent processing. For example, the method 600 may include presenting the product in interest contexts. For example, the interest scores in the product profile may be used to select the product when an opportunity arises to present an advertisement or search result relating to an interest having a score in the product profile. For example, if a user enters a search that specifies an interest, a product with a score, or a high score, relating to that interest, may be selected for display as a search result. The product could additionally or alternatively be selected for display as an advertisement adjacent the search results for the same reason. The product may also be presented as an advertisement in response to presentation of an article or other product relating to an interest for which the product has a score or has a high score.

User interaction with presentation of a product in interest-based contexts may be monitored 606. The interest score for the product may then be updated 608 according to the interaction. For example, if the product is presented in the context of interest A and a user clicks or hovers over an interface elements representing the product, buys the product, or otherwise interacts with the interface elements representing the product, the score for interest A in the product profile may incremented or otherwise increased according to the interaction. The amount by which the score for interest A is increased may be dependent on the type of the interaction. For example, a hover (which may result in presentation of additional information) may be scored a first amount, a click may be scored a second amount that is greater than the second amount, and a purchase may be scored a third amount that is greater than the second amount. In some embodiments, the number and type of interactions associated with an interest may be normalized or otherwise adjusted according to the number of opportunities to interact with the product that have been presented in a context relating to the interest as described above.

The method 600 therefore enables validation and refinement of interest scores for a product. These scores may then be used to determine advertisements and gift recommendations for a user based on the interests of the user, such as in accordance with the methods described herein.

Figure 7:
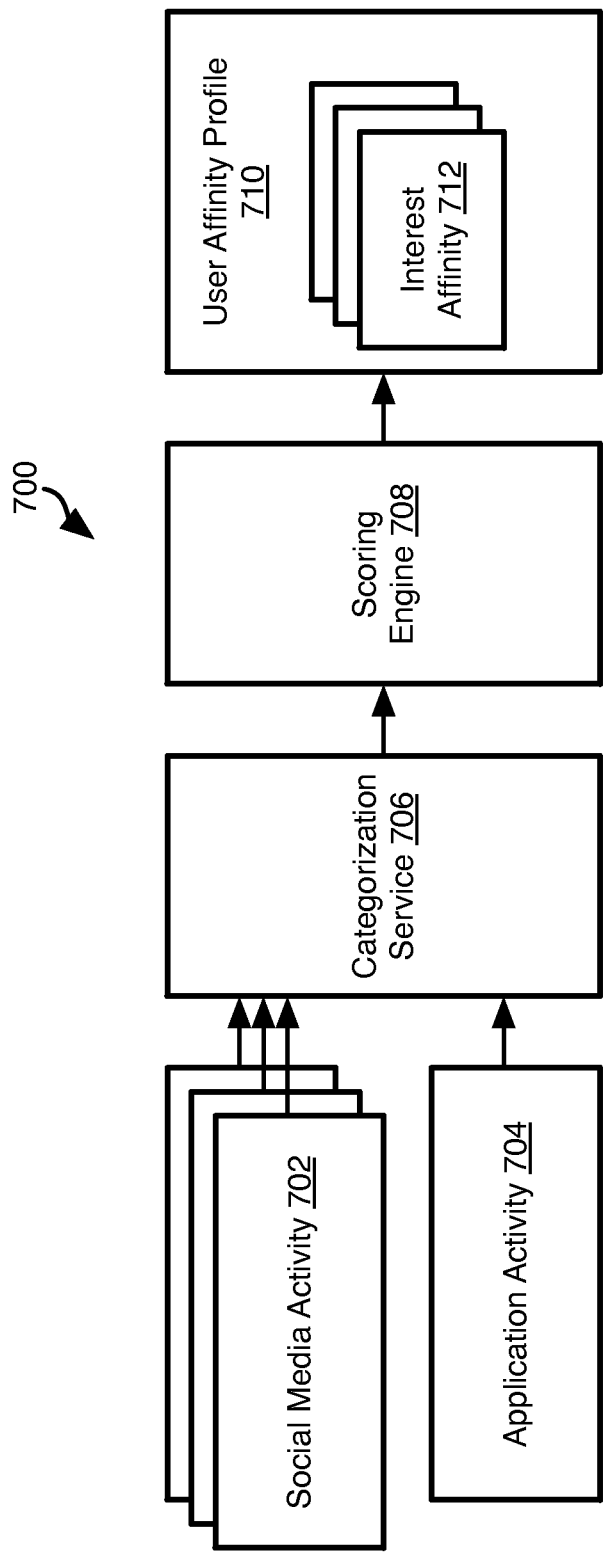
FIG. 7 is a system for scoring social media content in accordance with an embodiment of the present invention.

FIG. 7 illustrates a system 700 for updating a user interest profile according to social media activity. The system 700 may take as input social media activities 702. The social media activities may include content generated by a user such as Facebook™ postings (including "likes" or "dislikes", Twitter™ tweets, Foursquare™ checkins, Linkedin™ updates, or the like. The social media activities analyzed may be analyzed to identify textual actions in which the user interacts with text or generates textual information. For example, by "liking" an item of content, the text of that content may be used as the text for a corresponding textual action. Likewise, posting or tweeting a link may be viewed as a textual action where the corresponding text includes the text reached by means of the link, as well as any other text in the post or tweet. The system 700 may also take as inputs activity 704 relating to other applications, such as a web browser. The application activity 704 may include such activity as interest-based searches, interaction with advertisements or product listing for a product, online purchasing activity, and the like.

The social media activity 702 and application activity 704 may be input to a categorization service 706. The categorization service 706 is operable to map text associated with the activities 702, 704 to concepts in a taxonomy. The categorization service 706 may use any method known in the art to map text to a specific concept. For example, the categorization service 706 may use one or both of the method 400 described hereinabove and the methods described in the '524 application incorporated herein by reference. A scoring engine 708 may attribute scores to the categorized activities 702, 704 and a user affinity profile 710 for the user may be updated accordingly. In particular, an interest affinity record 712 for the concepts identified in the actions may be created or updated according to the output of the scoring engine 708.

Figure 8:
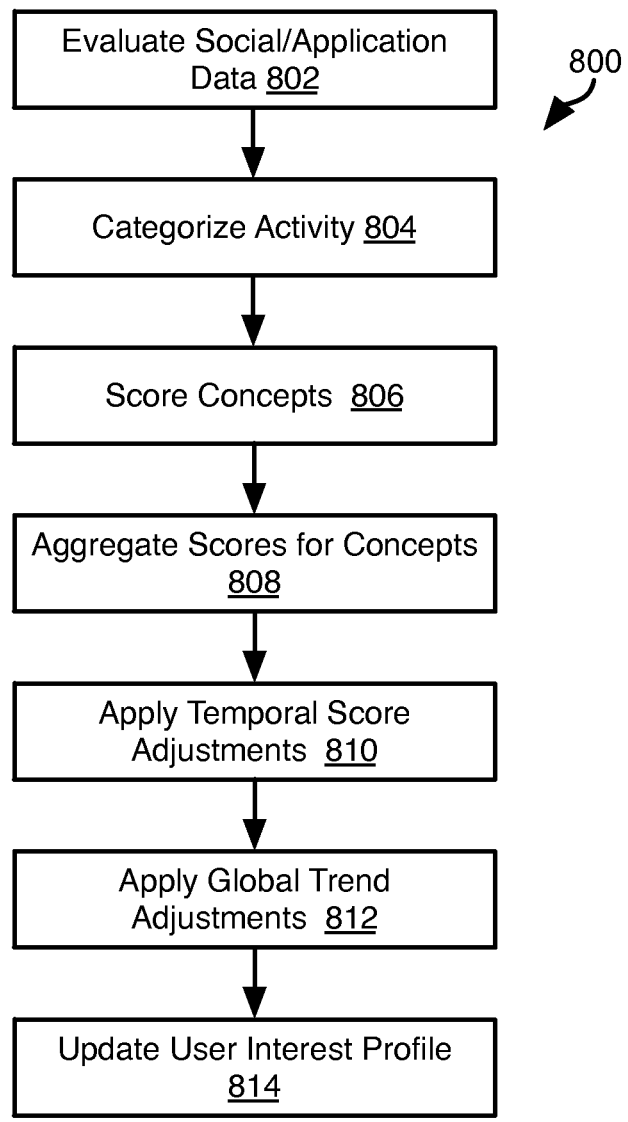
FIG. 8 is a process flow diagram of a method for scoring social media content in accordance with an embodiment of the present invention.

FIG. 8 illustrates a method 800 suitable for implementation using the system 700 or some other system. The method 800 may include evaluating 802 social and application activity data. This may include evaluating 802 textual actions and the text corresponding thereto identified among the social and application activity data.

Evaluating 802 may include performing on identified textual actions one or both of entity and sentiment extraction as described above with respect to FIG. 3 and disambiguation as described above with respect to FIG. 4. The entities identified according to the evaluation 802 may then be categorized 804. Categorizing 804 may include identifying concepts (i.e. interests) identifiable from the activity. This may include simple keyword matching or mapping of entities to concepts in a taxonomy according to contextual information in a user profile and the social activity being evaluated. Categorizing 804 may include concept extraction according to the methods described in the '524 application incorporated herein by reference.

The concepts may then be scored 806. Scoring 806 may include assigning a value to each concept identified in each evaluated textual action according to the type of the activity in which the textual action was generated. For example, a textual action A from an activity of type B, may reference concepts C, D, and E. Scores for concepts C, D, and E may then be generated or augmented according to the type B. This may be performed for each action of each type.

Scores for the same concept may then be aggregated 808. Continuing the example, this may include for each concept C, D, and E, summing the scores for the same concept to generate an interest score for the concepts C, D, and E. As an example, a reference to a concept C in a tweet may receive a score X due to its reference in a tweet, a reference to the concept C in a Facebook posting may receive a score Y that may be different from X, a click on a web page relating to C may receive a score Z that may be different from X or Y, and so on for each reference to concept C in each textual action of each type. The scores X, Y, Z, and any others for the concept C may then be summed, or added to an existing score, to generate an interest score indicating the user's interest in concept C.

In some embodiments, the method 800 may include applying 810 temporal score adjustment. This may include decreasing the score of concepts identified in older activities. For example, activities in social media or applications that occurred six months ago may not be as indicative of a user's current interests. Accordingly, using the same example as before, the scores X, Y, Z and others for a concept C may be scaled down according to the age of the activities corresponding to the scores X, Y, Z, and any others, prior to summing the scores to generate an updated interest score for the concept C in response to detecting additional activity or detecting the passage of an updating cycle period.

In some embodiments, the interest scores corresponding to a concept may be further adjusted by applying 812 global trend adjustments. When attempting to define a user's interests, one is generally attempting to find what is unique about the user. Accordingly, interests that are globally popular are not as helpful. Accordingly, interests may be discounted according to global popularity. Stated differently, interest scores may be adjusted in accordance with an inverse global popularity for the concept corresponding to the interest score.

A user profile may be updated 814 to include the newly calculated interest score or scores. If no score has previously been calculated for a concept, then a new entry may be created for the newly detected interest.

Figure 9:
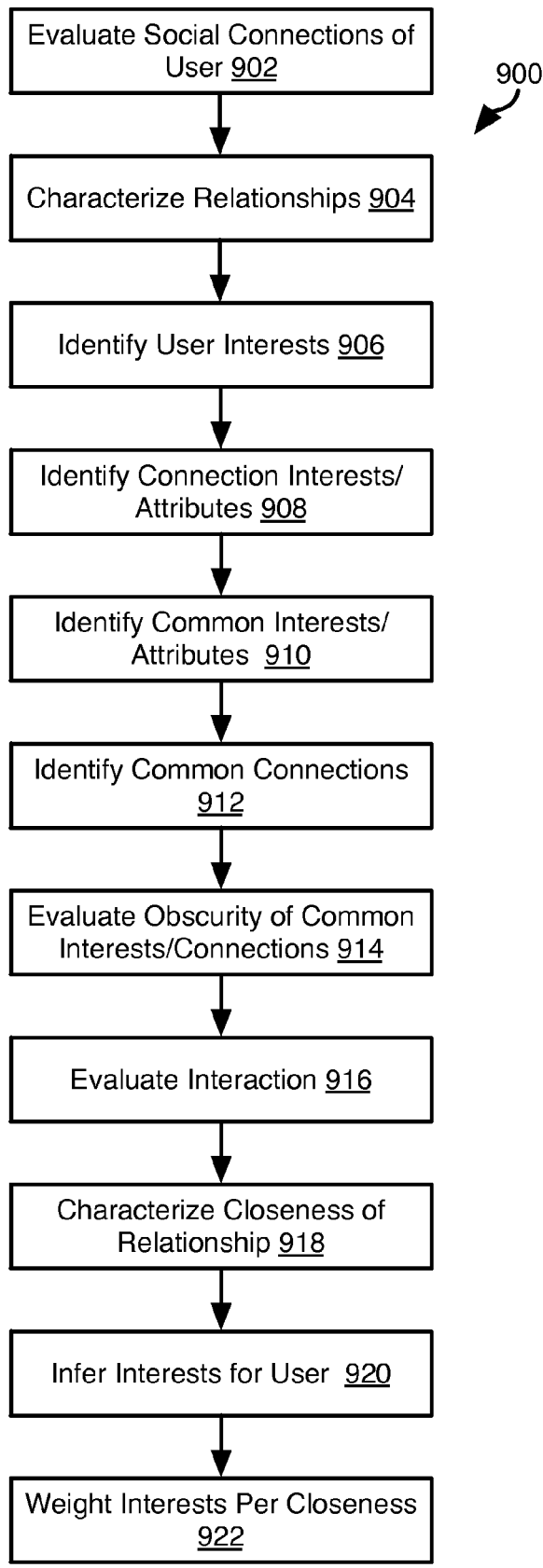
FIG. 9 is a process flow diagram of another method for inferring interests of a user from those of social media friends in accordance with an embodiment of the present invention.

FIG. 9 illustrates another method 900 for inferring interests of a user. The method 900 may be used as an alternative or in addition to the method 500 for inferring user interests. The method 900 may include evaluating 902 social connections of the user and characterizing 904 explicit or implicit indicators of the type of relationship between the user and the user's friends. This may include identifying whether a friend is a family member, friend, work associate, team member, or the like. In some embodiments, the social networking data may explicitly specify this information.

The method 900 may further include identifying 906 the user's interests and attributes. The interests and attributes may be identified according to explicitly defined interests in the user's profile or may be inferred from the user's social media activity, such as according to methods described herein. One or both of the interests and attributes of the friends connected to the user may also be identified 908. Identifying 908 the interests and attributes of friends connected to a user may be performed according to some or all of the same methods for identifying 906 the interests and attributes of the user.

The interests and attributes that are common to the user and the user's friends may then be identified 910. The connections that are common to the user and the user's friends may also be identified 912. The obscurity of one or both of the common interests and common connections may then be evaluated 914 along with an evaluation 916 of interaction between the user and the user's friends in order to characterize 918 the closeness of the relationship therebetween. Friends with whom a user interacts more often may be more rated as closer. Common interests with high global popularity do not necessarily indicate closeness of a relationship. Likewise, common connections to famous individuals or others with large numbers of friends do not indicate closeness of a relationship. In contrast, a common interest in a more obscure subject is an indicator of closeness of the relationship. Likewise, common connections between a small group of friends may also be an indicator of closeness of the relationship.

Accordingly, characterizing 918 the closeness of the relationship of the user with a particular friend may include assigning a score to each common interest or common friend and summing them to arrive at a "closeness" score. For example, a common friend may be assigned a value proportional to in inverse of the number of friends that common friend has. Likewise, a common interest may be assigned a value corresponding to an inverse of the global popularity of the concept. These values could also be scored or otherwise processed prior to summing to achieve a closeness score that corresponds well to actual closeness of the relationship between the user and the friend.

The interests of the friends of the user may then be evaluated to infer 920 interests that were not previously identified 906 for the user. These interests may then be weighted 922 according to the closeness of the user to the friend having the inferred interest. This may include weighting the interest according to the closeness score discussed above. This inferred interest as weighted may be used in making product and gift recommendations, such as according to the methods described herein.

Figure 10:
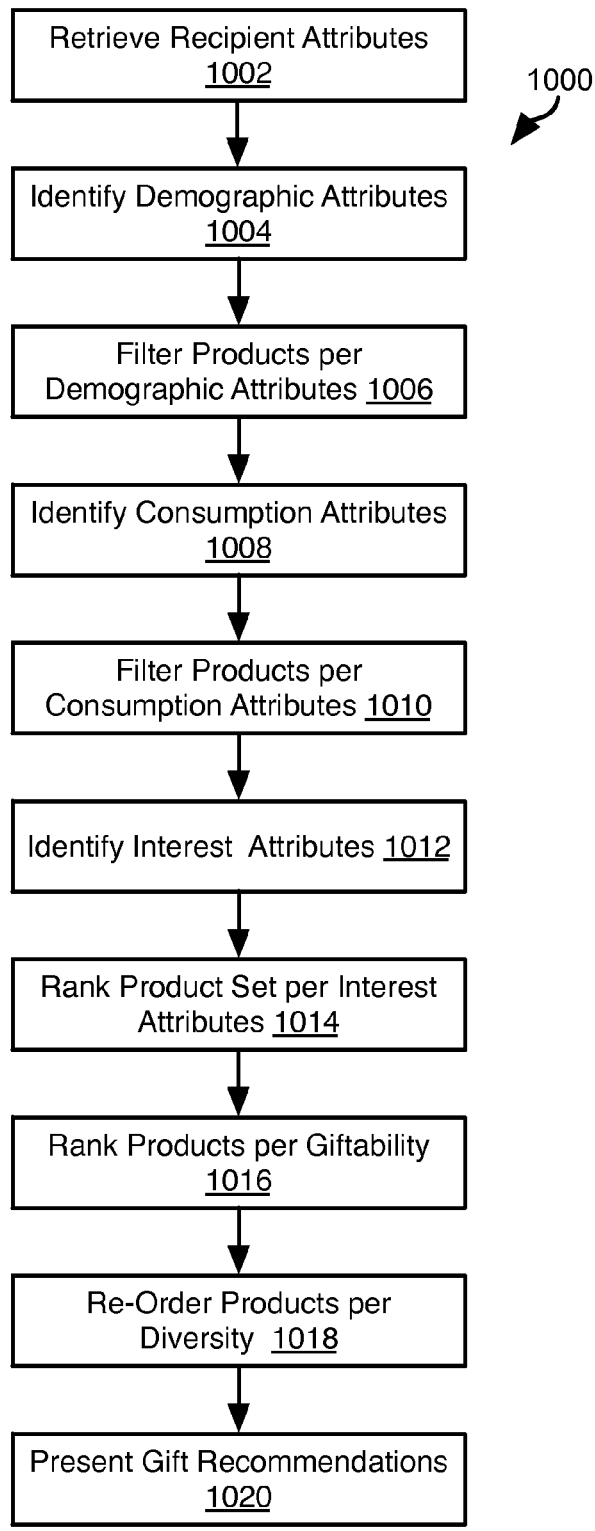
FIG. 10 is a process flow diagram of a method for generating gift recommendations in accordance with an embodiment of the present invention.

FIG. 10 illustrates a method 1000 for making gift recommendations. The method 1000 may use a user interest profile and product interest profile determined according to the methods disclosed herein, according to manually specified user and product interest profiles, or any other means. For purposes of FIG. 10 a user profile may be deemed to include attributes including interest attributes, consumption attributes, and demographic attributes. The consumption attributes include attributes that describe consumption habits of the user that are independent of actual topical interests. For example, a user may play games on a given platform (X Box, Playstation, Wii, or the like). Likewise a user may view videos using a DVD player, Blueray player, or by some streaming means. A consumption attribute may also include a price affinity, i.e., luxury priced products, high-end priced products, or ordinary priced products. These are very general attributes and might not rank highly as an interest given their lack of uniqueness. However, they are important in a gift selection process. Accordingly, consumption attributes may be collected or detected notwithstanding a lack of importance according to ranking schemes for other interests.

The method 1000 may include retrieving 1002 the attributes of a recipient. This may include retrieving a user interest profile, social network profile, or other profile data generated as described herein, including one or more inferred attributes or interests determined according to methods described herein. Demographic attributes may be identified 1004 and products from a product catalog may be filtered 1006 or otherwise selected according to the demographic attributes. This may include selecting products that are appropriate for the recipient's age, gender, country of residence, or the like. As noted above, products may have attributes associated therewith. Accordingly, filtering 1006 according to demographic attributes may include selecting products with attributes similar to the recipient's demographic attributes.

The method 1000 may further include identifying 10120 the consumption attributes of the recipient, as described above, and filtering 1010 products according to the consumption attributes. For example, where the recipient is interested in gaming and owns an Xbox, games for the Playstation may be eliminated.

Various other filtering steps may also be performed. For example, products may be ranked or filtered in view of a relationship of a prospective giver to a user. For example, some gifts may be appropriate for giving by a spouse while others are not. Likewise, a gift for a close family member may not be appropriate for a co-worker. The attributes that make a gift appropriate for one relationship and not another may be specified by a merchant or other entity. In some embodiments, products may be categorized or scored according to appropriateness for giving in a particular type of relationship. For example, where the relationship between a potential giver and the user is other than a close familial or romantic one, products with a large price may be filtered or otherwise ranked lower.

The method 1000 may further include identifying 1012 interest attributes for the recipient and ranking 1014 products remaining following any filtering steps according to their relationship to the interest attributes. As noted above, the interests of the recipient ranked according to their estimated importance to the recipient. Accordingly, ranking 1014 products may include ranking the products according to both the relationship of the product to the interests of the user and the ranking of the interests of the users to which the product relates.

In some embodiments, products may also be ranked 1016 or filtered according to giftability. Giftability may indicate the appropriateness for a product to be given as a gift. Accordingly, some or all of the products in a product catalog may have a giftability score associated therewith. The giftability score may be assigned manually according to human judgment that a product is appropriate for giving as a gift. The giftability score ay also be calculated automatically such as according to the methods described in co-pending U.S. patent application Ser. No. 13/601,579, filed Aug. 31, 2012, and co-pending U.S. patent application Ser. No. 13/601,604, filed Aug. 31, 2012. Accordingly, ranking 1016 or filtering products according to giftability may include ranking or filtering the products according to the giftability scores associated therewith.

In some instances, a simple ranking according to interests may result in a lack of diversity in gift recommendations. A giver may wish to have many options of gifts that are relevant to a recipient's interest and that are giftable. Accordingly, products may be re-ordered 1018 according to diversity. Re-ordering may include re-ranking to provide products of a variety of types relating to highly ranked interests. For example, a highly ranked interest in a musician may result in nothing but albums for the musician. Re-ordering may therefore include increasing the ranking or including in search results of other types of products relating to the musician, such as an autobiography, DVD of live concerts, sheet music, or other products.

A set of products from an original product as filtered and ranked according to some or all of the foregoing steps may then be presented 1020, or transmitted for presentation, to a prospective giver to facilitate the selection of a gift for the recipient.

The filtering and ranking steps of the method 1000 may be performed in any ordering with the ranked results or remaining products serving as input to a subsequent step. Some or all of the filtering or ranking steps may also be omitted in some embodiments. The method 1000 may be performed for purposes of presenting an advertisement to a friend of a recipient, as an advertisement for the recipient, or in any other context where targeted product recommendations may be helpful.

Figure 11:
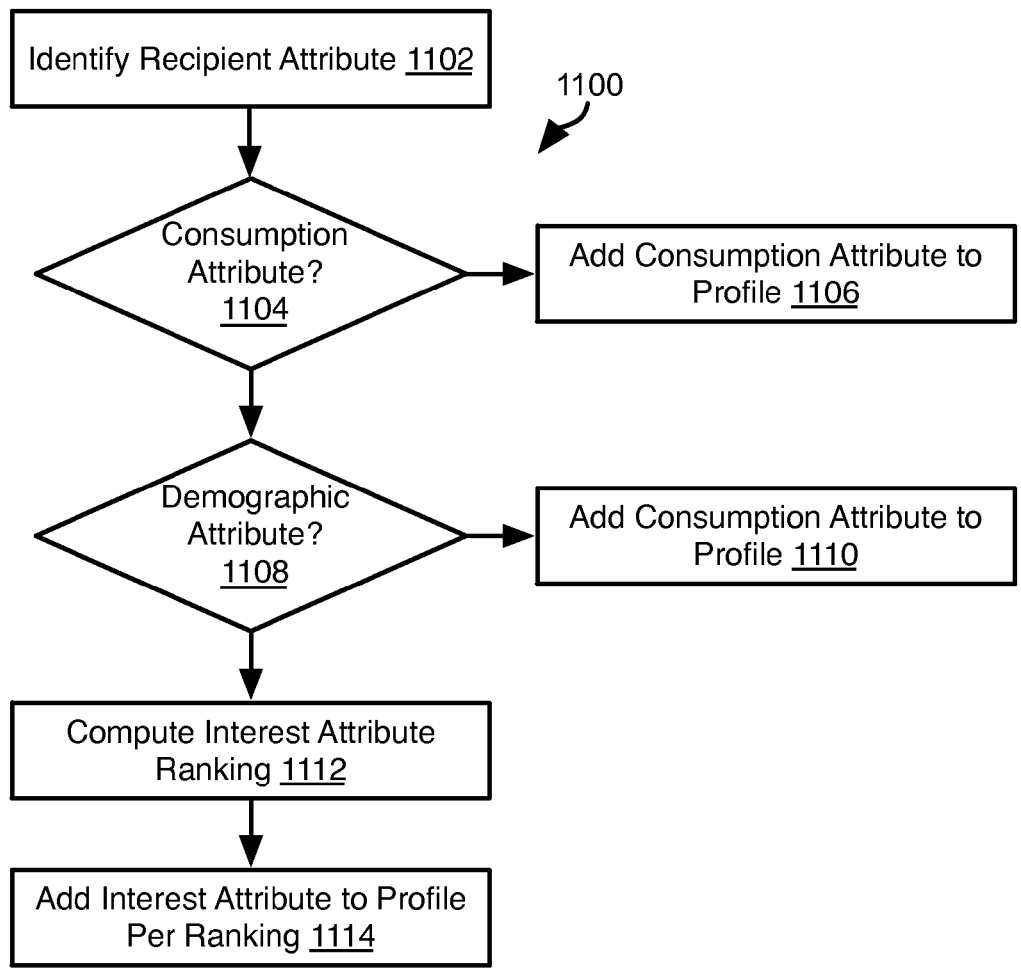
FIG. 11 is a process flow diagram of a method for categorizing attributes of a user in accordance with an embodiment of the present invention.

FIG. 11 illustrates a method 1100 that may be used to generate a recipient profile for use in the method 1000 of FIG. 10. The method 1100 may include identifying 1102 a potential attribute, i.e. an interest attribute, consumption attribute, or demographic attribute of a user. The method 1100 may include evaluating 1104 whether the attribute is a consumption attribute. If so, then the consumption attribute may be added 1106 to the profile for the recipient as a consumption attribute. If the attribute is found 1108 to be a demographic attribute, the identified demographic attribute may likewise be added 1110 to the recipient profile as a demographic attribute. For other attributes, e.g., interest attributes, the interest attribute may be ranked according to an apparent importance to the recipient. This may include ranking according to any of the methods described herein, such as the method 800 of FIG. 8 for updating an interest profile according to social media and other application activity. The interest and its corresponding score or ranking may also be added 1114 to the recipient's profile.

Figure 12:
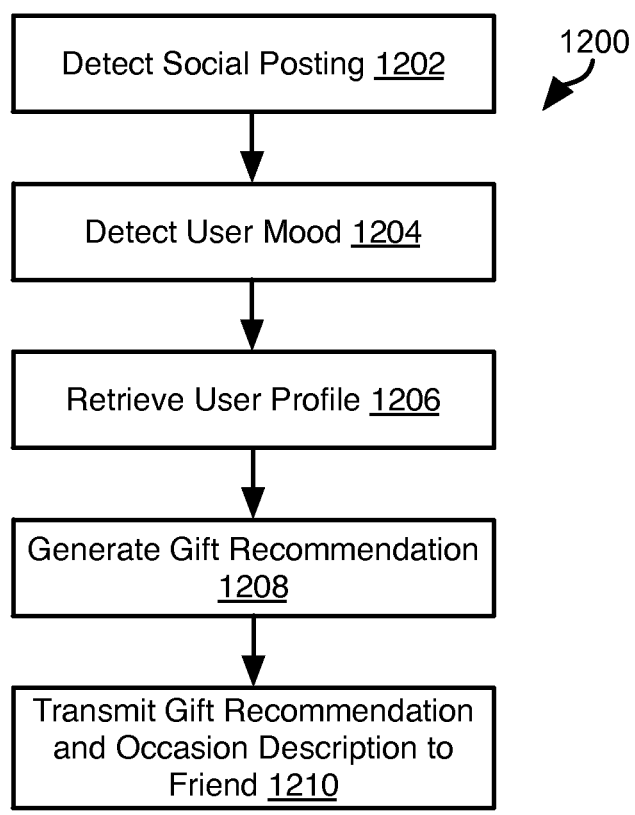
FIG. 12 is a process flow diagram of a method for generating real-time gift recommendations in accordance with an embodiment of the present invention.

FIG. 12 illustrates a method 1200 for generating recommendations in real time in response to a recipient's current situation. The method 1200 may include detecting 1202 a social media posting by a user and detecting 1204 the current mood or mental state of the user. This may include detecting mood related words such as "sad," "disappointed" or emotionally charged events such as "death," "birth," "win," "lose," or the like. In response to detecting words indicating an emotional state of unusual sadness or happiness may invoke retrieval of the user profile and the generation of one or more gift recommendations in accordance with the user profile, such as according to any of the methods described herein. The gift recommendations may then be transmitted 1210 to one or more friends of the user in accordance with social network connectivity data. Transmitting 1210 the gift recommendation may further include transmitting a description of the occasion or the user's mental state. The gift recommendation may also include an interface or a a link to a web site or other interface to enable a friend to order a gift and have the gift sent to the user. The friend may then purchase a gift and have it sent to the recipient in order to congratulate or commiserate with the user.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method for identifying interests comprising:
evaluating social media data of a user;
identifying from the social media data a plurality of communities each including a plurality of friends of the user, each community of the plurality of communities identified according to social media interconnections and interactions among friends of the user in each community;
identifying common interests from personal interests of the plurality of friends of the user for each community of the plurality of communities;
identifying, for each community of the plurality of communities, at least one characterizing interest of the common interests identified for each of the plurality of communities, the at least one characterizing interest being absent from any self-identified interests of the user in the social media data; and
selecting one or more inferred interests for the user from among the at least one characterizing interests of each community of the plurality of communities;
wherein identifying, for each community of the plurality of communities, at least one characterizing interest of the common interests identified for each community of the plurality of communities further comprises, for each community:
performing a first ranking of the common interests identified for the each community according to popularity of the common interests identified within the each community; and
selecting the at least one characterizing interest for the each community according to the first ranking; and
wherein selecting the one or more inferred interests for the user from among the at least one characterizing interests of the plurality of communities further comprises:
evaluating frequency of interaction of the user with the plurality of friends of the user corresponding to each community of the plurality of communities;
ranking the at least one characterizing interests of the plurality of communities according to the frequency of interaction of the user with the plurality of friends of the user corresponding to each community of the plurality of communities; and
selecting the one or more inferred interests according to the ranking.

2. The method of claim 1, wherein identifying, for the each community, the at least one characterizing interest of the common interests identified for each of the plurality of communities further comprises, for the each community:
performing a second ranking of the identified common interests for the each community according to an inverse of global popularity for the identified common interests; and
selecting the at least one characterizing interest for the each community according to the first ranking and the second ranking.

3. The method of claim 1, wherein selecting the one or more inferred interests for the user from among the at least one characterizing interests of the plurality of communities further comprises:
calculating a closeness for each of the plurality of communities;
ranking the at least one characterizing interests of the plurality of communities according to the closeness of the plurality of communities; and
selecting the one or more inferred interests for the user according to the ranking.

4. The method of claim 3, wherein calculating the closeness for each of the plurality of communities further comprises, for each of the plurality of communities:
identifying shared interests between the user and the plurality of friends of the user in each community;
evaluating global popularity of the shared interests; and
calculating the closeness for each community according to an inverse of the global popularity of the shared interests.

5. The method of claim 3, wherein calculating the closeness for each of the plurality of communities further comprises, for each of the plurality of communities:
evaluating a size of the each community; and
calculating the closeness for each community according to an inverse of size of each community.

6. The method of claim 1, wherein identifying from the social media data the plurality of communities further comprises at least one of:
identifying friends of the plurality of friends of the user that have each other as friends;

identifying friends of the plurality of friends of the user that have at least one other person as a common friend; and identifying friends of the plurality of friends of the user that have at least one attribute in common.

7. The method of claim 1, further comprising labeling the each community of the plurality of communities according to at least one of the at least one characterizing interest and a common attribute of the plurality of friends of the user of the plurality of communities.

8. The method of claim 7, further comprising transmitting a visual representation of the plurality of communities for display to the user.

9. A system for identifying interests comprising one or more processors and one or more memory devices operably coupled to the one or more processors, the one or more memory devices storing executable and operational data effective to cause the one or more processors to:

evaluate social media data of a user;

identify from the social media data a plurality of communities each community of the plurality of communities including a plurality of friends of the user, each community of the plurality of communities identified according to social media interconnections and interactions among friends of the user in each community;

for each community of the plurality of communities, identify common interests from personal interests of the plurality of friends of the user of the each community;

identify, for each community of the plurality of communities, at least one characterizing interest of the common interests identified for the each community, the at least one characterizing interest being absent from any self-identified interests of the user in the social media data; and select one or more inferred interests for the user from among the at least one characterizing interests of the plurality of communities;

wherein the executable and operational data further effective to cause the one or more processors to identify, for each community of the plurality of communities, at least one characterizing interest of the common interests identified for each community of the plurality of communities by, for each community:

performing a first ranking of the common interests identified for the each community according to popularity of the common interests identified within the each community; and selecting the at least one characterizing interest for the each community according to the first ranking; and wherein the executable and operational data are further effective to cause the one or more processors to select the one or more inferred interests for the user from among the at least one characterizing interests of the plurality of communities by:

evaluating frequency of interaction of the user with the plurality of friends of the user corresponding to each community of the plurality of communities;

ranking the at least one characterizing interests of the plurality of communities according to the frequency of interaction of the user with the plurality of friends of the user corresponding to each community of the plurality of communities; and selecting the one or more inferred interests according to the ranking.

10. The system of claim 9, wherein the executable and operational data are further effective to cause the one or more processors to identify, for each community of the plurality of communities, at least one characterizing interest of the common interests identified for each community of the plurality of communities by, for each community:

performing a second ranking of the common interests identified for the each community according to an inverse of global popularity for the common interests identified; and selecting the at least one characterizing interest for the each community according to the first ranking and the second ranking.

11. The system of claim 9, wherein the executable and operational data are further effective to cause the one or more processors to select one or more inferred interests for the user from among the at least one characterizing interests of the plurality of communities by:

calculating a closeness for each of the plurality of communities;

ranking the at least one characterizing interest of the plurality of communities according to the closeness of the plurality of communities; and selecting the one or more inferred interests for the user according to the ranking.

12. The system of claim 11, wherein the executable and operational data are further effective to cause the one or more processors to calculate the closeness for each of the plurality of communities by, for each of the plurality of communities:

identifying shared interests between the user and the plurality of friends of the user in each community;

evaluating global popularity of the shared interests; and calculating the closeness for each community according to an inverse of the global popularity of the shared interests.

13. The system of claim 11, wherein the executable and operational data are further effective to cause the one or more processors to calculate the closeness for each of the plurality of communities by, for each of the plurality of communities:

evaluating a size of each community; and calculating the closeness for the each community according to an inverse of size of each community.

14. The system of claim 9, wherein the executable and operational data are further effective to cause the one or more processors to identify from the social media data the plurality of communities by at least one of:

identifying friends of the plurality of friends of the user that have each other as friends;

identifying friends of the plurality of friends of the user that have at least one other person as a common friend; and identifying friends of the plurality of friends of the user that have at least one attribute in common.

15. The system of claim 9, wherein the executable and operational data are further effective to cause the one or more processors to label the plurality of communities according to at least one of the at least one characterizing interest and a common attribute of the plurality of friends of the user of the plurality of communities.

16. The system of claim 15, wherein the executable and operational data are further effective to cause the one or more processors to transmit a visual representation of the plurality of communities for display to the user.

* * * * *